United States Patent [19]

Rohweder et al.

[11] Patent Number: 4,886,561
[45] Date of Patent: Dec. 12, 1989

[54] METHOD OF MAKING AN INSULATED WINDOW

[75] Inventors: Theodore R. Rohweder; Richard J. Ray, Jr., both of Littleton, Colo.

[73] Assignee: Manville Corporation, Denver, Colo.

[21] Appl. No.: 207,593

[22] Filed: Jun. 16, 1988

[51] Int. Cl.⁴ .................... C03C 27/12; B32B 17/12
[52] U.S. Cl. ................................. 156/102; 52/790; 52/809; 156/292; 428/285; 428/428; 428/920
[58] Field of Search ............... 52/790, 809; 156/102, 156/292; 428/285, 428, 920

[56] References Cited

U.S. PATENT DOCUMENTS

| | | | |
|---|---|---|---|
| 4,268,581 | 5/1981 | De Boer | 428/428 |
| 4,275,801 | 6/1981 | Bschorr | 52/789 X |
| 4,571,915 | 2/1986 | Barman | 52/809 X |
| 4,796,404 | 1/1989 | Butler | 52/789 |

Primary Examiner—Robert A. Dawson
Attorney, Agent, or Firm—John D. Lister; Cornelius P. Quinn; Fred A. Winans

[57] ABSTRACT

An insulated window comprising a layer of insulation between two transparent sheets of glazing. The sheets are glued to the insulation layer and then separated so as to increase the thickness of the insulation, thereby providing a way to reduce the density of the insulation beyond the minimum density that can be manufactured. The light transmission of the insulation is substantially unaffected, but the thermal insulating value of the insulation is improved.

13 Claims, 2 Drawing Sheets

METHOD OF MAKING AN INSULATED WINDOW

FIELD OF THE INVENTION

This invention relates to insulated windows. More particularly, it relates to insulated windows which include a layer of fibrous insulation.

BACKGROUND OF THE INVENTION

In certain environments translucent windows or panels are preferred over transparent windows. For example, skylights in homes and in commercial and industrial buildings are often designed to keep out direct sunlight in order to reduce glare and to protect the interior of the building and its contents from the harsh effects of ultra violet light. Atriums, domes and clerestories are also often designed in this manner. In addition, structures which must admit light but which often must provide privacy as well, such as greenhouses and air-supported arenas, should preferably include translucent panels.

Translucent glass or plastic panels are readily available, but provide very little insulating value by themselves and would not be recommended for installations requiring protection against heat loss in the winter and heat gain in the summer. Translucent panels incorporating insulation material have been suggested, but they undesirably reduce the amount of light which the panels are capable of admitting. It would therefore appear that the requirements for insulating value and light transmission involve mutually restrictive qualities, and that improvement in one area would necessarily result in diminished performance in the other area.

It would obviously be highly beneficial to have an insulated translucent panel which provides good thermal insulation while at the same time being able to transmit adequate amounts of light, but prior to the present invention it did not appear possible to develop an economical panel with these characteristics.

SUMMARY OF THE INVENTION

This invention involves the use of a layer of fibrous insulation adhered to a sheet of glazing. The fibrous insulation is selected to provide a desired level of insulating value while at the same time permitting a predetermined amount of light to be transmitted therethrough. By moving the glazing sheet and the opposite face of the layer so as to further separate the two, the thickness of the fibrous layer can be expanded to thereby increase the thermal insulating value of the insulated translucent panel while maintaining the level of light transmission at substantially the same value.

Preferably, the insulation layer is bonded on both faces to two spaced glazing sheets so that transverse expansion or separation of the fibrous insulation occurs as a result of moving the glazing sheets in opposite directions. The glazing sheets are preferably transparent and the bonding material is preferably clear, in order to maximize the amount of light transmitted through the panel.

By this arrangement, fibrous insulation of low density can be bonded to the glazing sheets and the density can be significantly further lowered by pulling the opposite faces of the insulation layer in opposite directions. As a result of this operation a number of the bonds between the fibers in the fibrous layer are broken and a number of fibers which had been bent or folded during the manufacture of the insulation layer are now bent or folded to a lesser degree. Because the number of fibers in the insulation layer remains constant, the ability of the layer to transmit light is substantially unaffected. Because the thickness of the layer is increased, however, the thermal insulating value of the layer is increased, even with the corresponding reduction in density.

Other features and aspects of the invention, as well as other benefits of the invention, will readily be ascertained from the more detailed description of the invention which follows.

DESCRIPTION OF THE PREFERRED EMBODIMENT

Figure 1:
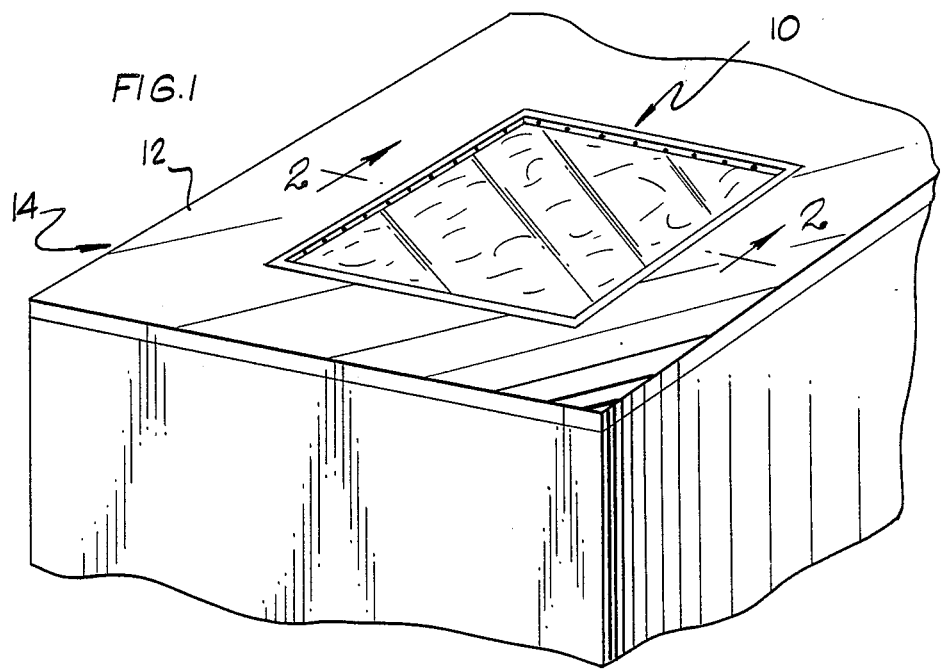
FIG. 1 is a partial pictorial view of a building structure containing a skylight formed in accordance with the invention.
Figure 2:
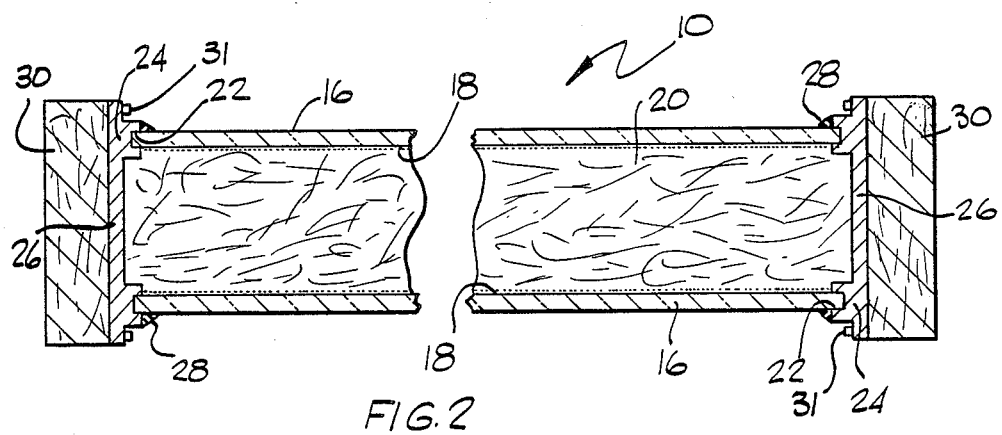
FIG. 2 is a partial transverse sectional view taken along line 2—2 of FIG. 1.

Referring to FIGS. 1 and 2, the panel 10 of the present invention is illustrated as comprising a skylight in the roof 12 of a building structure 14. The panel is comprised of spaced glazing sheets 16 bonded by a suitable adhesive 18 to opposite faces of a layer of fibrous insulation 20. The ends of the glazing sheets 16 are received in spaced slots or grooves 22 formed in the bosses or thickened portions 24 of support frame 26. Suitable sealing strips 28 may be used to seal the glazing sheets in the grooves. The support frame 26 is fastened to support members 30 of the roof structure by means of mechanical fasteners 31.

The glazing sheets 16 may be any conventional glass or plastic sheet having sufficient structural rigidity and strength to withstand the stresses of fabrication, installation and use. Preferably, the sheets should be transparent in order to provide as much light transmission as possible. For the same reason, the adhesive used to bond the layer of insulation to the glazing sheets should preferably be transparent when set. Any of many suitable available adhesives may be used, one example being a clear adhesive produced by National Starch Corporation and identified as Number 40-0857.

The insulation layer is fibrous in nature in order to permit the insulation to be expanded, as mentioned earlier and as discussed in more detail hereinafter. Preferably the insulation is comprised of bonded fiber glass because of its resiliency and light transmitting capability and because it is inexpensive and readily available in the form of blankets or layers of various thicknesses. A clear or white binder, such as a melamine binder, is preferred over commonly employed amber colored phenolic binders because of its superior light transmission properties.

Figure 3:
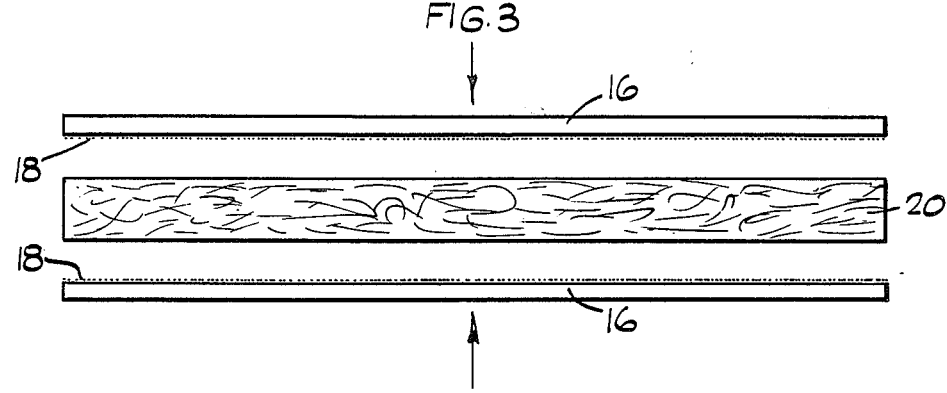
FIG. 3 is an exploded schematic view of an insulated panel formed in accordance with the invention.
Figure 4:
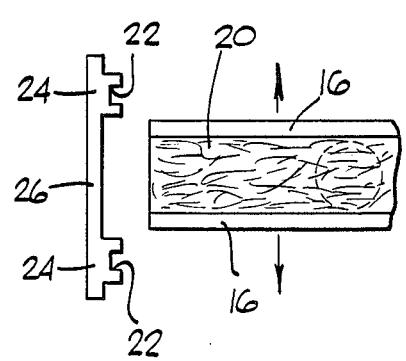
FIG. 4 is an end view of a portion of the insulated panel of the present invention at an interim stage of fabrication.

To fabricate the panel of the invention, a layer of fiber glass 20 and two sheets of glass or plastic 16 are provided. As shown in FIG. 3, the inner faces of the sheets 16 are coated with a clear adhesive 18 and the sheets are moved toward the faces of the layer 20 as shown by the arrows. Obviously, the adhesive may be provided on the faces of the insulation layer or on both the sheets of glazing and the insulation instead of only on the glazing. The sheets of glazing will then contact and be adhered to the faces of the insulation layer as shown in FIG. 4. Note that the thickness of the resulting laminate is less than the distance between the grooves 22 of the support frame 26.

Figure 4A:
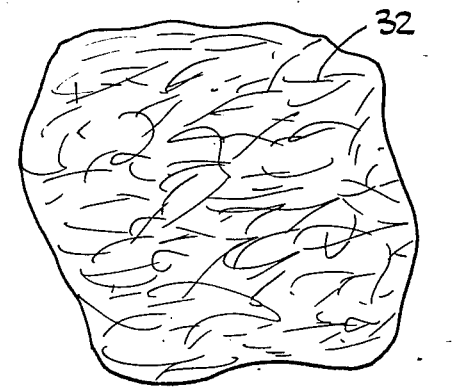
FIG. 4A is an enlarged view of the fibrous insulation material encompassed by the circle shown in FIG. 4.

At this stage in the fabrication of the panel the glass fibers of the insulation layer 20 are in substantially the same relationship with respect to each other as they were when the insulation layer was manufactured. For purposes of illustration this relationship is shown in FIG. 4A to comprise a conventional arrangement of a number of intertwined and interconnected individual fibers 32. Some of the fibers are folded or bent as a result of the layer of insulation having been compressed to a degree during manufacture. Some fibers are also bonded to each other by suitable binder which has been conventionally applied during manufacture of the insulation as is well known in the art.

Figure 5:
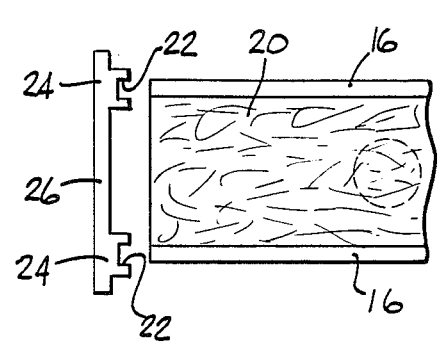
FIG. 5 is an end view of the portion of the insulated panel of FIG. 4 after the layer of insulation has been expanded to its final thickness.
Figure 5A:
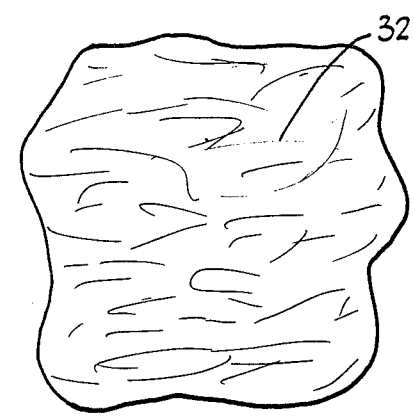
FIG. 5A is an enlarged view of the fibrous insulation material encompassed by the circle shown in FIG. 5.

After the sheets of glazing 16 are firmly adhered to the insulation layer 20, the next step in the fabrication of the panel is to move the sheets away from each other in the direction of the arrows shown in FIG. 4. This action if continued beyond the capacity of the insulation to maintain its integrity would eventually pull the insulation apart. It is possible to stop well before that point, however, after the fibrous insulation has been partially pulled apart or expanded the proper amount, so that the laminate is of the thickness shown in FIG. 5. In this condition the laminate is of proper thickness for the edges of the sheets of glazing 16 to fit into the spaced grooves 22. The relationship of the fibers in the expanded layer of fiber glass is shown in FIG. 5A to be somewhat different than the relationship illustrated in FIG. 4A. The fibers are spaced farther apart and some of the bonds between adjacent fibers will have been torn or broken. In addition, some of the fibers which had been folded or bent during manufacture will have been somewhat straightened as the resiliency of the fibers is permitted to come into play upon the breaking of the bonds between fibers.

Thus it is possible with the present invention to produce an insulated panel which has a much improved combination of light transmission and insulation qualities over previous translucent panels. For example, even though a sandwich panel comprised of transparent glass sheets and a layer of low density fiber glass insulation may not provide adequate thermal insulation for a particular installation, the same combination of materials fabricated in the manner of the invention would have satisfactory insulating properties. This is quite significant when it is considered that a nominal density of 0.5 pcf is as low as conventional high speed fiber glass insulation production lines are able to manufacture, and yet the present invention would enable the use of insulation having a density of 0.25 pcf. In other words, the only way fibrous insulation of conventional manufacture could be made to provide more insulation would be to use a thicker layer. But since that would reduce the transmission of light, this way is not acceptable.

By expanding or separating the insulation material to a greater thickness, the number of fibers in the insulation layer remains the same even though the number of fibers per unit of cubic measurement is decreased. Since the amount of light transmission is a function of the number of fibers per square foot of insulation regardless of the thickness of the product, the ability of insulation which has been expanded in accordance with the invention to transmit light is not substantially affected. On the other hand, because the thermal insulating value of fibrous insulation is a function of the increased thickness of the expanded insulation, the invention substantially increases the thermal performance of the insulated panel of the inventin with little sacrifice in light transmission.

Preferably, to obtain the greatest benefits from the invention, the initial density of the fibrous insulation would be in the range of about 0.4–0.7 pcf, and would be reduced by the method of the invention to a range of about 0.2–0.35 pcf.

By way of example, a layer of bonded fiber glass having a thickness of $\frac{3}{4}''$ was adhered on both faces to sheets of Lexan transparent glazing having a thickness of 1/32''. The fiber glass layer had a nominal density of 0.5 pcf which in this case was an actual density of 0.467 pcf. This sandwich panel had an R value of 2.44 and a light transmission of 32. The thermal conductivity was arrived at by using ASTM test C-518 HM#32 while the light transmission was determined by measuring absolute light transmission in accordance with ASTM test D-1494.

The glazing sheets were then separated until the thickness of the fiber glass layer was $1\frac{1}{8}''$, which produced a density of 0.311 pcf. The R value of the panel was 3.10 and the light transmission was 31%. Further separation until the thickness of fiber glass was $1\kappa''$ produced a density of 0.233. The R value of the resulting panel was 3.64 and the light transmission was 30%. Thus the reduction in density of the product due to separation of the fibers brought about by doubling the thickness of the insulation resulted in considerably higher insulating values but with only an inconsequential reduction in light transmission.

Although the invention has been described in connection with a flat skylight, it should be obvious that it could be used in connection with other shapes and other types of installations. For example, the panel could be curved instead of flat and could be adapted for use in an atrium, dome or clerestory as well as in a skylight. Further, any convenient means for fastening the panels to the building structure can be used, the particular fastening means shown and described herein having been included by way of example only.

It should now be understood after reading the foregoing description that the invention is not necessarily limited to the specific structural details described in connection with the preferred embodiment, but that those skilled in the art may make changes to certain features of the preferred embodiment without affecting the overall performance and concept of the invention and without departing from the spirit and scope of the invention, as defined by the appended claims.

What is claimed is:

1. A method of producing an insulated window product, comprising the steps of:
   providing a layer of fibrous insulation having opposite faces, the layer permitting a predetermined amount of light to be transmitted therethrough;

adhering one face of the insulation layer to a sheet of glazing;

causing relative movement away from each other between the opposite face of the insulation layer and the sheet of glazing while maintaining the integrity of the insulation layer, to thereby increase the spacing between the sheet of glazing and the opposite face of the insulation layer; and securing the sheet of glazing and the opposite face of the insulation layer in place to maintain the increased spacing therebetween.

2. A method according to claim 1, wherein the layer of insulation is comprised of bonded fiber glass.

3. A method according to claim 1, wherein the fiber glass is bonded together by a binder comprised of melamine binder.

4. A method according to claim 1, wherein the glazing sheet is comprised of glass.

5. A method according to claim 1, wherein the glazing sheet is comprised of plastic.

6. A method according to claim 1, wherein the glazing sheet is transparent.

7. A method according to claim 2, wherein said one face of the insulation layer is adhered to the sheet of glazing by transparent glue.

8. A method according to claim 1, including the step of adhering the opposite face of the layer of insulation to a second sheet of glazing.

9. A method according to claim 8, wherein the relative movement between the opposite face of the insulation layer and the sheet of glazing is caused by moving the first and second sheets of glazing away from each other.

10. A method according to claim 9, wherein the spacing between the first and second sheets of glazing is maintained by installing the separated sheets of glazing in a window opening of a building structure.

11. A method of producing an insulated window product, comprising the steps of:

providing a layer of bonded fibrous insulation having opposite faces, the layer having a density in the approximate range of 0.4–0.7 pcf and permitting a predetermined amount of light to be transmitted therethrough;

adhering one face of the insulation layer to a first sheet of glazing and the opposite face of the insulation layer to a second sheet of glazing;

moving the first and second sheets of glazing away from each other while maintaining a sufficient number of bonds between the fibers of the fibrous layer so as to maintain the integrity of the insulation layer, thereby increasing the thickness of the insulation layer and further reducing the density of the insulation layer without significantly reducing the light transmission properties of the fibrous layer; and securing the sheets of glazing in their spaced relationship to maintain the increased thickness and reduced density of the insulation layer.

12. A method according to claim 1, wherein the thermal insulating value of the insulation layer of increased thickness is significantly improved over the thermal insulating value of the insulation layer prior to separation of the adhered sheets of glazing.

13. A method according to claim 12, wherein the sheets of glazing are separated a distance to cause the density of the insulation layer to be reduced to the approximate range of 0.2–0.35 pcf.

* * * * *

UNITED STATES PATENT AND TRADEMARK OFFICE
CERTIFICATE OF CORRECTION

PATENT NO. : 4,886,561

DATED : December 12, 1989

INVENTOR(S) : Theodore R. Rohweder, et al

It is certified that error appears in the above-identified patent and that said Letters Patent is hereby corrected as shown below:

Column 6, line 26 "claim 1" should be --claim 11--

Signed and Sealed this

Twelfth Day of February, 1991

Attest:

HARRY F. MANBECK, JR.

Attesting Officer

Commissioner of Patents and Trademarks